(12) United States Patent
Francois et al.

(10) Patent No.: US 12,350,974 B2
(45) Date of Patent: Jul. 8, 2025

(54) METHOD FOR DETERMINING THE WEAR CONDITION OF AN AIRCRAFT TIRE

(71) Applicant: COMPAGNIE GENERALE DES ETABLISSEMENTS MICHELIN, Clermont-Ferrand (FR)

(72) Inventors: Olivier Francois, Clermont-Ferrand (FR); Julien Brunet, Clermont-Ferrand (FR)

(73) Assignee: COMPAGNIE GENERALE DES ETABLISSEMENTS MICHELIN, Clermont-Ferrand (DE)

( * ) Notice: Subject to any disclaimer, the term of this patent is extended or adjusted under 35 U.S.C. 154(b) by 1425 days.

(21) Appl. No.: 16/471,435

(22) PCT Filed: Dec. 18, 2017

(86) PCT No.: PCT/FR2017/053642
§ 371 (c)(1),
(2) Date: Jun. 19, 2019

(87) PCT Pub. No.: WO2018/115675
PCT Pub. Date: Jun. 28, 2018

(65) Prior Publication Data
US 2021/0129596 A1    May 6, 2021

(30) Foreign Application Priority Data

Dec. 20, 2016  (FR) ..................................... 16/62818

(51) Int. Cl.
*B60C 11/24*   (2006.01)
*B64C 25/36*   (2006.01)
(Continued)

(52) U.S. Cl.
CPC ............ *B60C 11/246* (2013.01); *B64C 25/36* (2013.01); *G06F 16/51* (2019.01); *G06V 20/20* (2022.01);
(Continued)

(58) Field of Classification Search
CPC ... B60C 11/246; B60C 2200/02; B64C 25/36; G06F 16/51; G06V 20/20; G06V 30/153
See application file for complete search history.

(56) References Cited

U.S. PATENT DOCUMENTS 4,635,694 A * 1/1987 Hosokawa ............ B60C 11/033
152/209.9
5,895,845 A   4/1999 Buerger
(Continued)

FOREIGN PATENT DOCUMENTS

CN    202399839 U    8/2012
CN    104246424      12/2014
(Continued)

OTHER PUBLICATIONS

Merriam-Webster, "Optoelectronics", 1959, https://www.merriam-webster.com/dictionary/optoelectronic (Year: 1959).*
(Continued)

*Primary Examiner* — Catherine T. Rastovski
*Assistant Examiner* — Yossef Korang-Beheshti
(74) *Attorney, Agent, or Firm* — COZEN O'CONNOR (57) ABSTRACT

Method for determining the state of wear of an aeroplane tire to predict its remaining number of landings, wherein the aeroplane tire has a tread with a circumferential ridge having a wear indicator, where the method includes capturing a first positioning pattern of the wear indicator that marks the positioning of the wear indicator in the tread, capturing a second state pattern of the wear indicator that determines the state of wear of the circumferential ridge concerned at a
(Continued)

given instant, analyzing the captured first positioning pattern and the captured second state pattern of the wear indicator, by comparison to reference patterns, determining the state of wear of the circumferential ridge at a given instant, and rendering information on the state of the tire.

14 Claims, 5 Drawing Sheets

(51) Int. Cl.
  *G06F 16/51* (2019.01)
  *G06V 20/20* (2022.01)
  *G06V 30/148* (2022.01)

(52) U.S. Cl.
  CPC ........ *G06V 30/153* (2022.01); *B60C 2200/02* (2013.01)

(56) References Cited

U.S. PATENT DOCUMENTS

| | | | |
|---|---|---|---|
| 6,523,586 B1* | 2/2003 | Eromaki | B60C 11/24 152/DIG. 3 |
| 2006/0124214 A1* | 6/2006 | Bauchot | B60C 11/24 702/34 |
| 2006/0156790 A1* | 7/2006 | Bocquillon | B60C 11/246 73/8 |
| 2009/0320581 A1 | 12/2009 | Angell | |
| 2012/0075089 A1* | 3/2012 | Miller | B60C 23/066 340/443 |
| 2013/0186531 A1* | 7/2013 | O'Brien | B60C 11/1625 152/154.2 |
| 2019/0135048 A1* | 5/2019 | Thompson | B60C 11/24 |

FOREIGN PATENT DOCUMENTS

| | | | |
|---|---|---|---|
| EP | 1066991 A2 | | 1/2001 |
| JP | 2010179778 A | * | 8/2010 |
| KR | 20070096697 A | * | 10/2007 |
| KR | 101425019 B1 | * | 8/2014 |
| WO | WO 2016/063093 | | 4/2016 |

OTHER PUBLICATIONS

Shih-Yen Huang et al., "The Tires Worn Monitoring Prototype System Using Image Clustering Technology", Recent Trends in Applied Artificial Intelligence, Springer Berlin Heidelberg, Berlin, pp. 626-634, Jun. 17, 2013.

Office Action dated May 10, 2021 issued in European Patent Application No. 17828957.5.

* cited by examiner

METHOD FOR DETERMINING THE WEAR CONDITION OF AN AIRCRAFT TIRE

RELATED APPLICATIONS

This is a U.S. National Phase Application under 35 USC 371 of International Application PCT/FR2017/053642 filed on Dec. 18, 2017.

This application claims the priority of French application no. 1662818 filed Dec. 20, 2016, the entire content of which is hereby incorporated by reference.

FIELD OF THE INVENTION

The subject of the present invention is a method for determining the state of a tire for an aeroplane, and more particularly a method for determining its state of wear.

BACKGROUND OF THE INVENTION

It is known that the tread of a tire, intended to come into contact with the ground via a rolling surface, is the wearing part of the tire, that is to say that it undergoes a reduction of thickness resulting from the rolling of the tire. The tread is generally composed of elements in relief separated from one another by hollows, this combination constituting what is commonly called a sculpture. In the case of a tire for aircraft, the elements in relief are more often than not circumferential ridges, continuous over all the circumference of the tire and separated from one another by hollows called circumferential grooves. The wear causes the height of the circumferential ridges and, correlatively, the depth of the circumferential grooves to be reduced, thus degrading the performance of the tire. The wear of a circumferential ridge, at a given instant in the life of the tire, is generally quantified by a wear ratio. The wear ratio is equal to the ratio $(H_o-H)/H_o$, where $H_o$ and $H$ are, respectively, the initial height $H_o$ of the circumferential ridge, measured on the new tire, and the remaining height $H$ of the circumferential ridge, measured on the worn tire. Thus, the state of wear of a tire, more specifically of its tread, and even more specifically of the circumferential ridges of its tread, can be defined by the respective remaining heights of the circumferential ridges, constituting its tread, measured at a given instant in the life of the tire, or by their corresponding respective wear ratios.

Regarding the specific field of tires for an aeroplane, the person skilled in the art has highlighted two types of wear depending on the phase of use of the tire. On landing, the median part of the tread, whose axial width is at least equal to 50% and at most equal to 80% of the total axial width of the tread, is subjected, when the rolling surface enters into contact with the ground, to a wear called "touchdown wear", resulting from a significant abrasion and from a high thermal heating, because of the speed differential between the speed of rotation of the tire and the speed of the aeroplane. In taxying phase, before the aeroplane has taken off or after it has landed, the lateral parts of the tread, positioned axially on either side of the median part and whose respective axial widths are at least equal to 10% and at most equal to 25% of the total axial width of the tread, are subject to a wear called "taxi wear", resulting from the braking forces exerted on these lateral parts because of their speed of rotation, which is greater than that of the median part. Thus, the tread is mainly worn, in its median part, on landing, and, in its lateral parts, in taxi phase.

The wear described previously often leads to the presence of a non-uniform wear of the tread, called uneven wear, resulting from the stresses during the different phases of use of the tire: take-off, taxying and landing. More particularly, a differential wear of the tread between the median part and the two lateral parts of the tread has been revealed, the wear of this median part being generally greater. The differential wear of the median part of the tread leads to a limitation on the life of the tire, therefore on its use and to its early removal, even though the tread generally exhibits only a relatively low wear of the lateral parts of the tread: which is disadvantageous economically.

In practice, a tire for an aeroplane is removed when the wear ratio of one or more circumferential ridges of the tread reaches a maximum acceptable value, generally benchmarked as base 100, and the worn tire is then replaced.

One difficulty known to any operator of tires for aeroplanes is how to predict, reliably, the replacement of the worn tires and schedule the corresponding maintenance operations. A poor scheduling of the maintenance operations can in fact cause untimely downtimes of the aeroplane inducing additional operating costs for the user. To avoid these downtimes, a storage of replacement tires is often implemented, on each of the airports frequented by the aeroplane fleet operator, to be able to perform tire replacements, at any moment, which is disadvantageous economically.

The scheduling of the tire replacement operations is complex, because, in particular, of the difficulty in predicting of the wear a tire for an aeroplane. In effect, the remaining thickness of the tread as a function of the number of landings performed, which characterizes the speed of wear of the tread and more specifically the speed of touchdown wear, does not vary linearly. The remaining wear potential, measuring the remaining number of landings that can be performed before complete wear, cannot be determined by a simple measurement of the remaining height of the circumferential ridges of the tread. By way of example, the inventors have been able, in a particular case, to show that a tread, theoretically allowing 400 landings to be performed before complete wear, corresponding to a wear ratio of 100%, in reality allows 160 landings to be performed, corresponding to 40% of the total forecast number of landings, with a wear ratio of 75%. In other words, the trend of the wear ratio as a function of the number of landings is not linear.

In practice, the respectively initial $H_o$ and remaining $H$ heights of a circumferential ridge are often determined by a direct measurement of the corresponding depth of the adjacent circumferential groove, using a suitable measurement tool, which presents the drawback of giving a certain tediousness to the tracking of the wear.

The wear ratio of the tread can also be determined using wear indicators, also called wear tell-tales. Conventionally, these wear indicators can be of two types: wear indicators in relief relative to a circumferential groove bottom and wear indicators positioning in the thickness of the circumferential ridges.

A wear indicator, composed of an element in relief relative to a circumferential groove bottom, generally has a height substantially lower than the initial height of the circumferential ridge. When the remaining height of the circumferential ridge, adjacent to the circumferential groove comprising the wear indicator, reaches an allowable minimum value, corresponding to the top level of the wear indicator, the allowable maximum wear ratio is reached and triggers the replacement of the tire. Such a wear indicator does not however make it possible to quantify the progressive trend of the wear of the tread during use: it simply indicates that the allowable maximum wear ratio is reached.

It has also been proposed to position wear indicators in the thickness of the circumferential ridges, such that the trace of these wear indicators on rolling surface can visually warn that the allowable minimum height of the circumferential ridges, defining the allowable maximum wear ratio of the circumferential ridge, was reached.

All the wear indicators previously described make it possible to determine, by a direct visual observation, the remaining heights and/or the wear ratios of one or more circumferential ridges of the tread of a tire for an aeroplane, at a given instant in the life of the tire. However, this method for determining the state of wear of a tire by direct visual observation does not make it possible, in particular, to anticipate the remaining life, characterized essentially by the remaining number of landings that can be performed, before the replacement of the tire.

SUMMARY OF THE INVENTION

One object of the present invention is to provide a method for determining the state of a tire for an aeroplane, more specifically its state of wear that makes it possible to predict the remaining life of said tire.

This objective was achieved through one aspect of the present invention directed to a method for determining the state of a tire for an aeroplane, said tire comprising a tread having at least one circumferential ridge comprising at least one wear indicator, said determination method comprising:
- a step of capture of a first positioning pattern of the wear indicator, intended to mark the positioning of said wear indicator in the tread,
- a step of capture of a second state pattern of the wear indicator, intended to determine the state of wear of the circumferential ridge concerned at a given instant,
- a step of analysis of the first positioning pattern and of the second state pattern of the wear indicator captured, by comparison to reference patterns, and of determination of the state of wear of the circumferential ridge at a given instant,
- a step of rendering of information on the state of the tire.

The method for determining the state of a tire for an aeroplane according to an embodiment of the invention is more specifically a method for determining its state of wear, based on the observation of the trend of at least one wear indicator positioned in a hollow, in the thickness of a circumferential ridge of the tread of the tire. More often than not, the tread of a tire for an aeroplane comprises at least three circumferential ridges axially separated from one another by at least one circumferential groove.

The wear indicator used in the method according to an embodiment of the invention comprises a first positioning pattern and a second state pattern. The first positioning pattern is intended to mark the positioning of the wear indicator in the tread. More often than not it is intended to mark the axial positioning of the wear indicator, that is to say its positioning in the axial width of the tread, the axial direction being, by convention, parallel to the axis of revolution of the tire. The second state pattern is intended to quantify the wear ratio of the circumferential ridge at any instant in the life of the tire.

A first and a second step of the method for determining the state of the tire are steps of capture, respectively, of the first positioning pattern and of the second state pattern of the wear indicator, using suitable means. In effect, the first and second pattern of the wear indicator can have differentiated aspects, potentially requiring the use of different capture means or different settings of one and the same capture means. As an example, a capture means can be a camera possibly incorporated in an optoelectronic system, for example of smartphone type or of tablet type.

A third step of the method for determining the state of the tire is a step of analysis of the first positioning pattern and of the second state pattern of the wear indicator captured, by comparison to reference patterns, and of determination of the state of wear of the circumferential ridge at a given instant. The aim of this step is to identify the positioning of the wear indicator in the tread and to determine its state of wear. This analysis can be performed via local means or a remote database. The step of analysis of the first positioning pattern and of the second state pattern of the wear indicator captured is performed by comparison to reference patterns. These reference patterns, to which the patterns captured on the tire are compared, represent, for a wear indicator positioned at a given point of the tread, the various states of wear encountered successively by the circumferential ridge during the life of the tire. These reference patterns can be stored locally, for example in the capture means, or remotely in a database to which the capture means are linked.

Finally, a fourth step of the method for determining the state of the tire is a step of rendering of information on the state of the tire. This rendering step can be implemented by specific means or means identical to those of the capture step. The information on the state of wear of the tire can be of various kinds, such as, for example and not exclusively, a wear ratio of the circumferential ridge as an absolute value, a differential wear ratio of the circumferential ridge, as a relative value, relative to the other circumferential ridges, or a remaining number of landings that can still be performed by the aeroplane.

Preferably, the step of capture of a first positioning pattern of the wear indicator and the step of capture of a second state pattern of the wear indicator are simultaneous. As an example, this step can consist in a photographing of the wear indicator as a whole, that is to say a simultaneous photographing of its positioning and state patterns respectively.

The rendering step advantageously comprises a step of display on an interface intended for a user. Such a display step makes it possible to have a direct visual rendering to the user who is performing the monitoring of the tire, hence a time saving.

According to a first rendering mode, the rendering step comprises information relating to a wear ratio $U=(H0-H)/H0$ of the circumferential ridge, at a given instant, H0 being the initial height of the circumferential ridge, measured on the tire in a new state, and H being the remaining height of the circumferential ridge, measured on the tire when it is at least partly worn.

According to a second rendering mode, the rendering step comprises information relating to the remaining number of landings authorized by the state of wear of the circumferential ridge at a given instant. In this case, the information of wear type ratio is not rendered as such. However, the wear ratio being correlated to a remaining number of landings, according to a previously established mathematical model, it is the number of landings itself which is rendered to the user.

According to a third rendering mode, the rendering step comprises information relating to an uneven wear of the circumferential ridge at a given instant. This information can, by way of example, relate to a differential wear ratio between two distinct circumferential ridges.

The method for determining the state of a tire for an aeroplane according to the invention advantageously comprises a step of identification of the tire. It is in fact necessary to correctly identify the tire, as an individual, to be able to track the trend of its specific wear and decide on its possible replacement. In fact, because of their respective manufacturing characteristics and their different positions on the landing gear of the aeroplane, two tires generally have differentiated wear kinematics.

A step of identification of the tire is generally performed by recognition of an individualized marking or by reading an RFID (Radio Frequency Identification) identifier of the tire. According to a first identification mode, the individualized marking of the tire, consisting of a series of digits, is generally captured, this marking being able to be highlighted, for example by a chalk marking which allows for a contrast with the rest of the tire. According to a second identification mode, an RFID identifier, implanted in the tire, for example via a glued label, contains tire identification data which can be read by a suitable means.

More often than not, the method for determining the state of a tire for an aeroplane comprises a step of transmission of captured information to a database. It is in fact advantageous to have a remote database, avoiding having too much information stored locally.

It is advantageous for the method for determining the state of a tire for an aeroplane to include a step of transmission of captured information to a database, this captured information relating to a geolocation of the tire and/or the date and the time of the capture steps. This automatic transmission of geolocation and temporal data avoids specific reading and recording of these data, separate from the determination method.

Another aspect of the invention is directed to a system for implementing the method for determining the state of a tire for an aeroplane according to any one of the embodiments of the method previously described.

The system for implementing the method for determining the state of a tire for an aeroplane comprises:
capture means,
data transmission means,
analysis means,
a database.

Preferably, the system for implementing the method for determining the state of a tire for an aeroplane comprises display means concerning the state of the tire. That allows direct visual information for the user.

Again preferably, the system for implementing the method for determining the state of a tire for an aeroplane comprises capture means and/or display means and/or data transmission means and/or analysis means implemented by an optoelectronic device, preferably of smartphone type or of tablet type. Thus, a smartphone makes it possible both to capture the image of a wear indicator by means of integrated camera, to view it on its display, to transmit this captured image to a remote database, via its transmission function, and to retrieve, via this same transmission function, information relating to the state of wear from the corresponding wear indicator and view it on the display.

BRIEF DESCRIPTION OF THE DRAWINGS

The features of the invention will be better understood from FIGS. 1 to 7, not represented to scale.

DETAILED DESCRIPTION OF THE DRAWINGS

Figure 1:
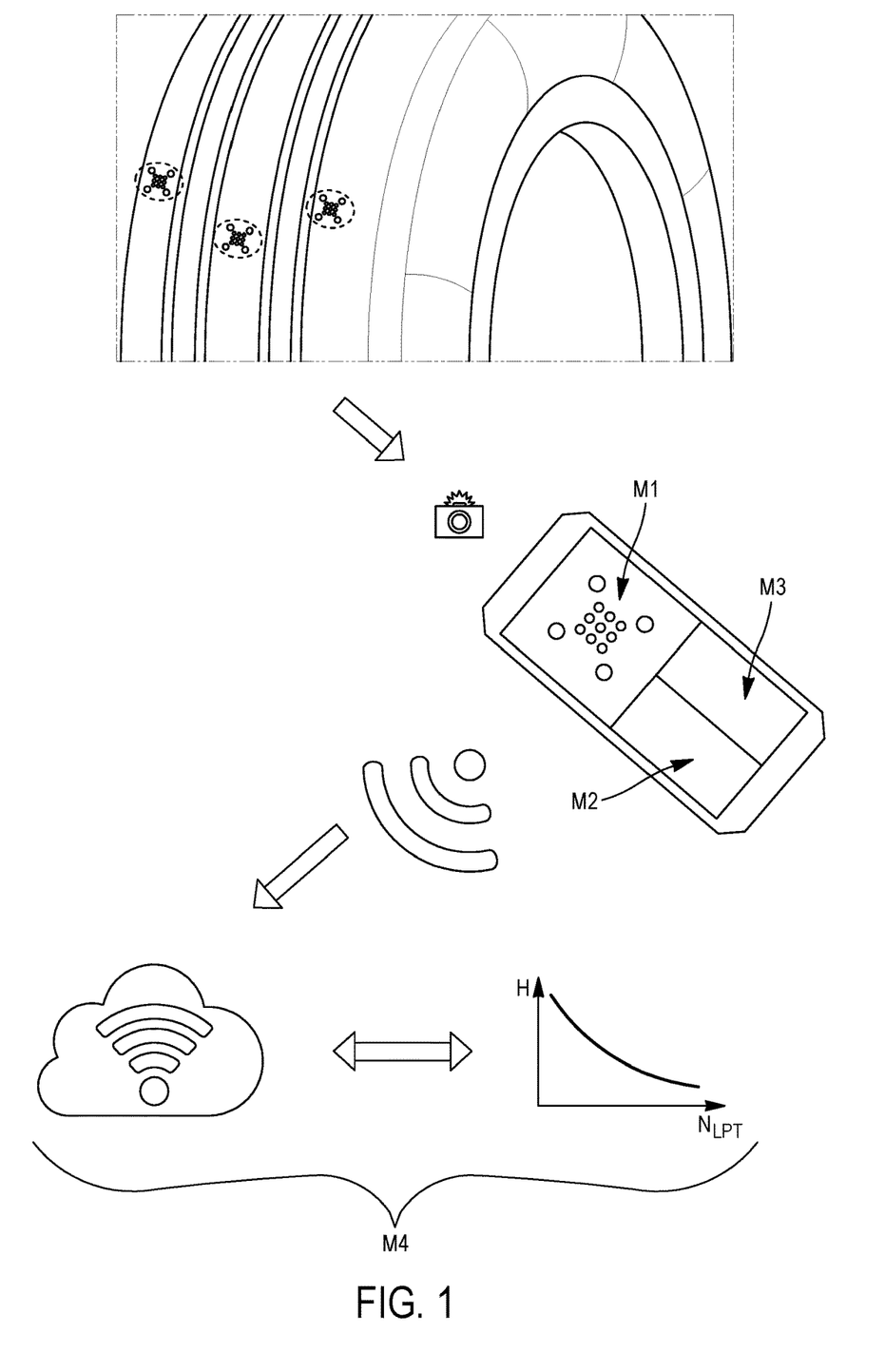
FIG. 1: schematic representation of the sequencing of the steps of the method for determining the state of a tire for an aeroplane according to a preferred embodiment of the invention

FIG. 1 is a schematic representation of the sequencing of the steps of a preferred embodiment of the method for determining the state of a tire for an aeroplane. In the example presented, the tire comprises five circumferential ridges, including a median circumferential ridge and two shoulder circumferential ridges, axially outermost, comprising a wear indicator composed of a first positioning pattern intended to mark the positioning of said wear indicator in the tread, and of a second state pattern, intended to determine the state of wear of the circumferential ridge concerned at a given instant. For each wear indicator, a first step consists of a step of simultaneous capture of the first positioning pattern and of the second state pattern of the wear indicator, using a capture means M2 of camera type incorporated in a smartphone or in a tablet. The display means M1 of the smartphone make it possible to directly view the image of the wear indicator thus captured. A second step is a step of transmission of the first positioning pattern and second state pattern of the wear indicator to a remote database M4, by communication means M3 incorporated in the smartphone. A third step is a step of analysis of the first positioning pattern and of the second state pattern of the wear indicator captured and of determination of the state of wear of the circumferential ridge at a given instant, in the remote database, by comparison with reference patterns stored in the remote database M4 and by referring to wear trend curves covering the life of the tire, such as, for example, curves of the trend of the remaining height H of the circumferential ridge as a function of the number of landings performed NLPT (Number of Landings Per Tread). Finally, a last step is a step of rendering of information on the state of the tire, such as the wear ratio U=(H0−H)/H0 of the circumferential ridge, at a given instant, H0 being the initial height of the circumferential ridge, measured on the tire in a new state, and H being the remaining height of the circumferential ridge, measured on the tire when it is at least partly worn, or the remaining number of landings.

Figure 2:
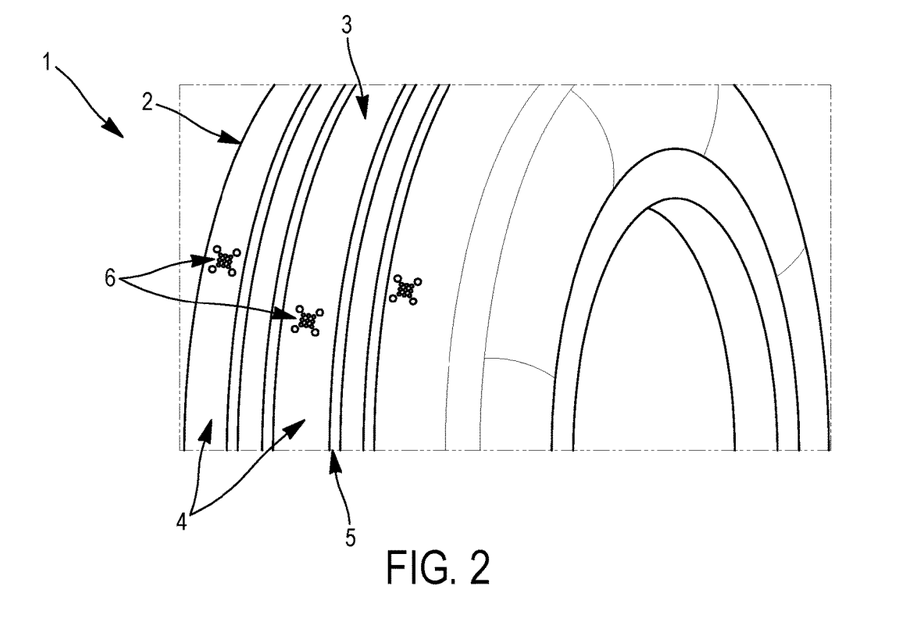
FIG. 2: partial perspective view of a tire for an aeroplane comprising wear indicators suited to the method for determining the state of a tire for an aeroplane according to an embodiment of the invention

FIG. 2 represents a partial perspective view of a tire for an aeroplane, comprising wear indicators suited to the method for determining the state of a tire for an aeroplane according to the invention. The tire 1 comprises a tread 2, intended to come into contact with the ground via a rolling surface 3. The tread 2 comprises five circumferential ridges 4 and four circumferential grooves 5 separating the circumferential ridges in pairs. Two shoulder circumferential ridges, axially the outermost, and the median circumferential ridge each comprise a wear indicator 6 comprising cylindrical cavities emerging on the rolling surface 3 and independent of one another.

Figure 3:
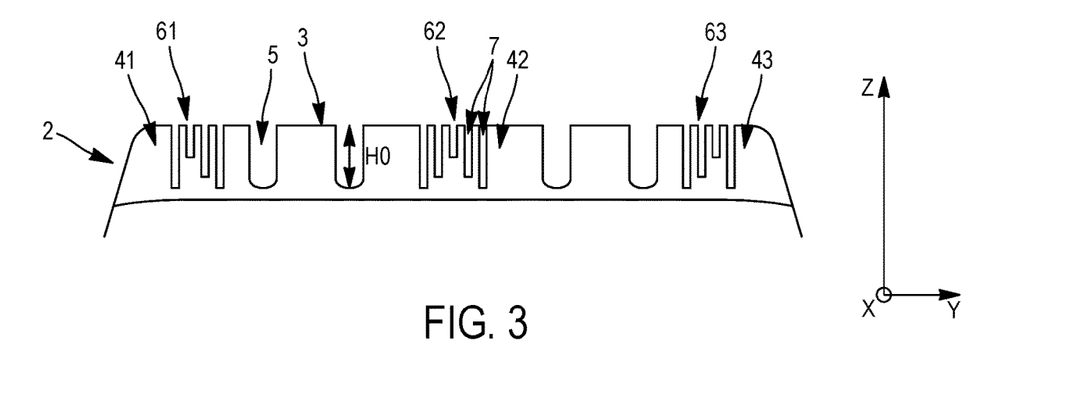
FIG. 3: meridian cross section of the tread of a tire for an aeroplane comprising wear indicators suited to the method for determining the state of a tire for an aeroplane according to an embodiment of the invention

FIG. 3 represents a meridian cross section of the tread of a tire for an aeroplane comprising wear indicators suited to the method for determining the state of a tire for an aeroplane according to the invention. The tread 2 comprises five circumferential ridges, including two shoulder circumferential ridges (41, 43) and a median circumferential ridge 42, each comprising a wear indicator (61, 62, 63). Each wear indicator (61, 62, 63) comprises cylindrical cavities 7 emerging on the rolling surface 3 and independent of one another. Each circumferential ridge (41, 42, 43) has an initial height H0, measured on the tire in the new state, and is intended to be worn to an allowable remaining height HR (not represented).

Figure 4:
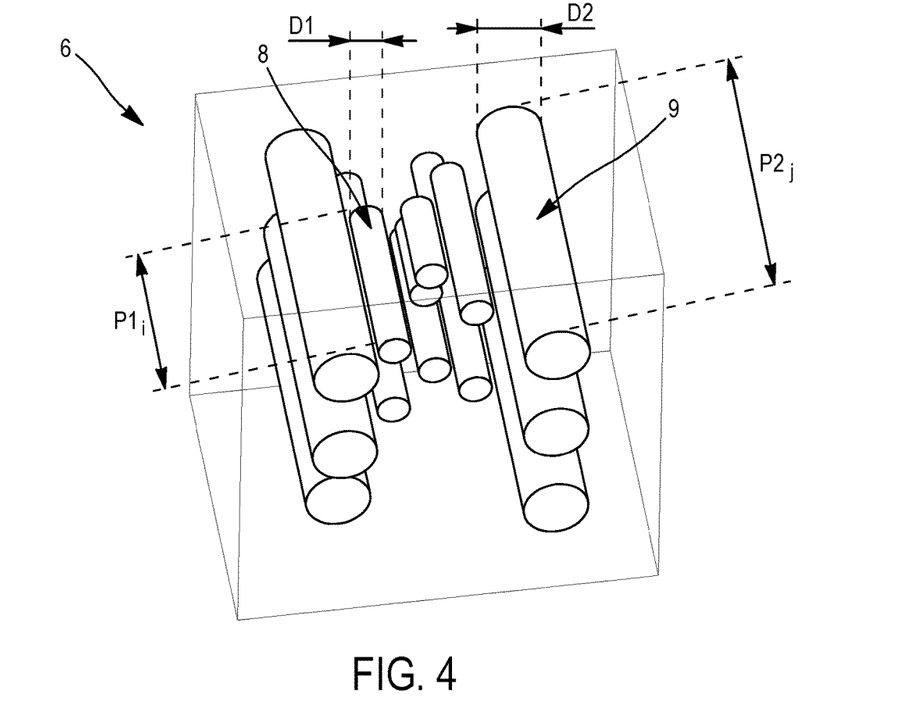
FIG. 4: perspective view of a wear indicator

FIG. 4 shows a perspective view of a wear indicator. The wear indicator 6 comprises a state pattern composed of a first family of wear cavities 8, intended to quantify the wear ratio of the circumferential ridge at any instant in the life of the tire, each wear cavity 8 being a cylinder of depth $P1_i$ having an emerging surface inscribed in a circle of diameter D1. The wear indicator 6 comprises a positioning pattern composed of a second family of positioning cavities 9, intended to mark the axial positioning of the wear indicator, that is to say its positioning in the axial width of the tread, each wear cavity 9 being a cylinder of depth $P2_j$ having an emerging surface inscribed in a circle of diameter D2.

Figure 5:
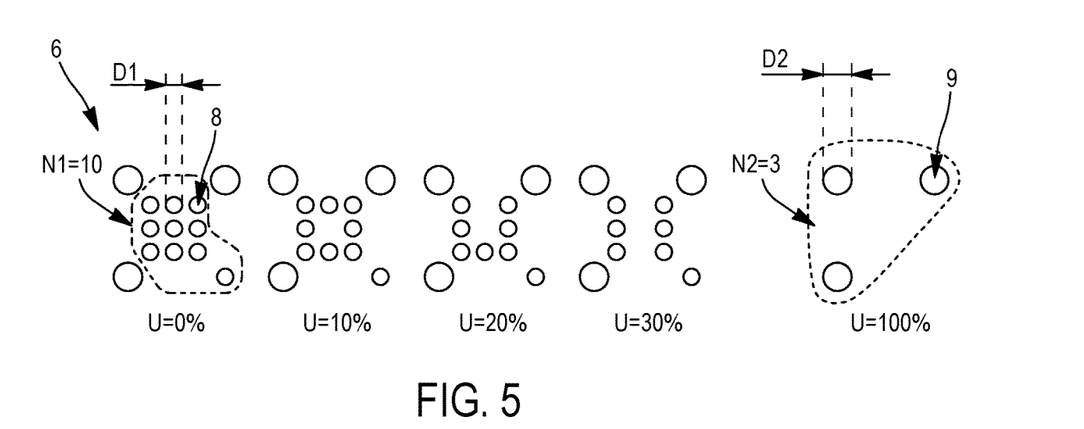
FIG. 5: plan view of a wear indicator, with different wear ratios

FIG. 5 represents a plan view of a wear indicator, with different wear ratios. The wear indicator 6 comprises a state pattern composed of a first family of N1=10 wear cavities 8 having an emerging surface inscribed in a circle of diameter D1 and a positioning pattern composed of a second family of N2=3 positioning cavities 9 having an emerging surface inscribed in a circle of diameter D2. The wear indicator is represented with various wear ratios. As seen previously, the wear ratio is, by definition, equal to U=1−H0/H, H0 being the initial height of the circumferential ridge, on a new tire, and H being the height of the circumferential ridge, on a tire which is at least partially worn. On the new tire, the wear ratio U is therefore equal to 0%. On the completely worn tire, the wear ratio U is equal to 1−H0/HR, HR being the allowable remaining height: by convention, this maximum wear ratio is taken to be equal to 100%. A wear ratio equal to 10% corresponds to a circumferential ridge height equal to H=H0−0.1*(H0−HR) and, more generally, a wear ratio equal to i % corresponds to a circumferential ridge height equal to H=H0−(i/100)*(H0−HR). For a zero wear ratio, the wear indicator 6 comprises ten wear cavities 8 and three positioning cavities 9. For a wear ratio equal to 10%, a first wear cavity $C1_1$, having a depth $P1_1$ equal to 0.1*(H0−HR), has been completely worn and is no longer visible on the rolling surface: the wear indicator 6 then comprises nine wear cavities 8 and three positioning cavities 9. For a wear ratio equal to 20%, a second wear cavity $C1_2$, having a depth $P1_2$ equal to 0.2*(H0−HR), has been completely worn and is no longer visible on the rolling surface: the wear indicator 6 then comprises eight wear cavities 8 and three positioning cavities 9. For a wear ratio equal to 30%, a third wear cavity $C1_3$, having a depth $P1_3$ equal to 0.3*(H0−HR), has been completely worn and is no longer visible on the rolling surface: the wear indicator 6 then comprises seven wear cavities 8 and three positioning cavities 9. Finally, for a wear ratio equal to 100%, all the wear cavities 8 of the wear indicator 6 have been completely worn: only the three positioning cavities 9 are visible, the respective depths of which $P2_j$, j varying from 1 to 3, are strictly greater than H0−HR.

Figure 6A:
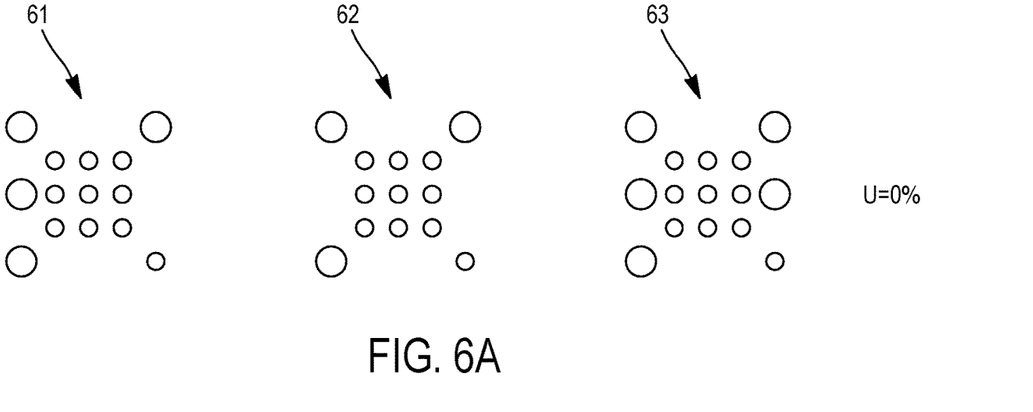
FIG. 6A: plan view of 3 wear indicators, positioned respectively on a median circumferential ridge and two shoulder circumferential ridges, for a tire in the new state

FIG. 6A represents, for a new tire with zero wear ratio, three wear indicators (61, 62, 63) respectively positioned in the median circumferential ridge 42 and the shoulder circumferential ridges (41, 43), said circumferential ridges not being represented in FIG. 6A. The wear indicator 61 of a first shoulder circumferential ridge comprises N1=10 wear cavities and N2=4 positioning cavities. The wear indicator 62 of a median circumferential ridge comprises N1=10 wear cavities and N2=3 positioning cavities. The wear indicator 63 of a second shoulder circumferential ridge comprises N1=10 wear cavities and N2=5 positioning cavities. The three wear indicators (61, 62, 63) have the same number N1 of wear cavities and different numbers N2 of positioning cavities, making it possible to differentiate them from one another and to identify that they belong to a given circumferential ridge.

Figure 6B:
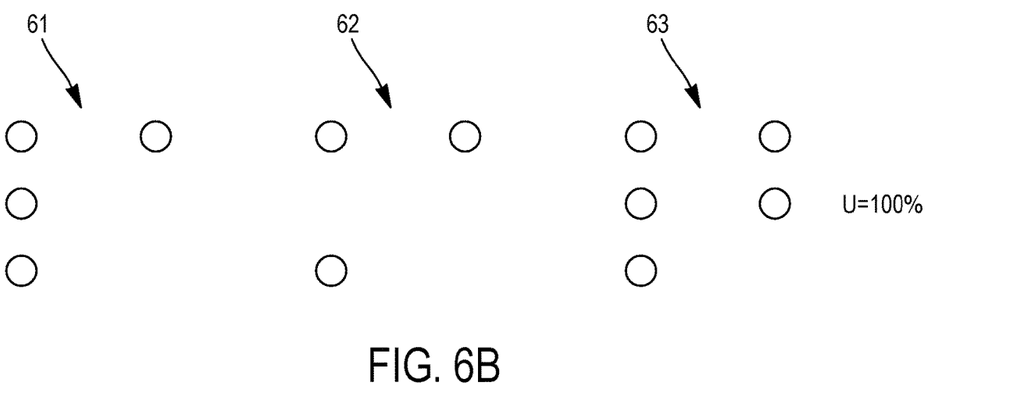
FIG. 6B: plan view of 3 wear indicators, positioned respectively on a median circumferential ridge and two shoulder circumferential ridges, for a totally worn tire

Similarly, FIG. 6B represents, for a totally worn tire with a wear ratio equal to 100%, three wear indicators (61, 62, 63) respectively positioned in the median circumferential ridge 42 and the shoulder circumferential ridges (41, 43), said circumferential ridges not being represented in FIG. 6B. Only the N2 respective positioning cavities of each of the three wear indicators are visible, with N2=4 for the first shoulder circumferential ridge, N2=3 for the median circumferential ridge and N2=5 for the second shoulder circumferential ridge.

Figure 7:
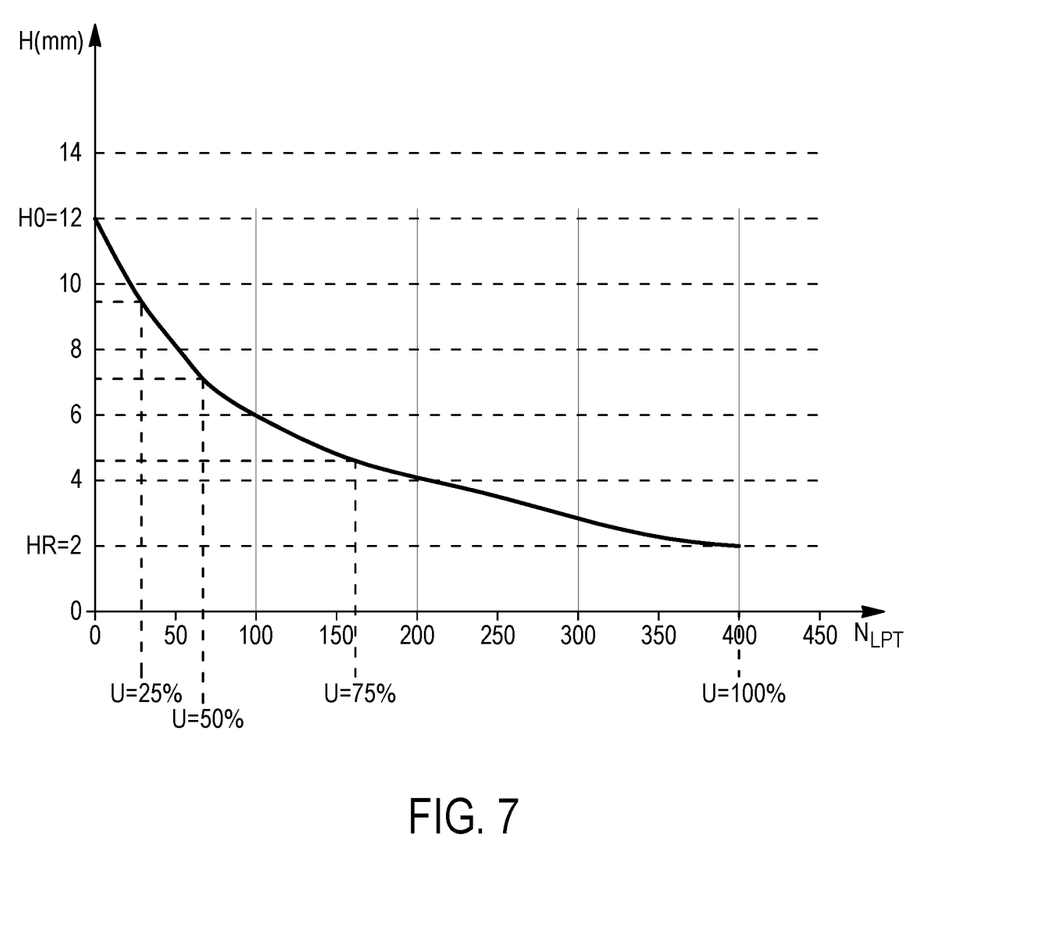
FIG. 7: variation of the height H of a circumferential ridge as a function of the number of landings performed.

Finally, FIG. 7 presents the variation of the height H of a circumferential ridge as a function of the number of landings performed $N_{LPT}$ (LPT meaning "Landings Per Tread"). In the example presented, the height H of the circumferential ridge varies from an initial value equal to 12 mm, for a new tire with zero wear ratio, when no landing has yet been performed, to an allowable remaining value HR equal to 2 mm, for a totally worn tire with a wear ratio equal to 100%, after 400 landings. The trend of the height H as a function of the number of landings performed $N_{LPT}$ is not linear. Thus, wear ratios U equal to 25%, 50% and 75% correspond respectively, in the present case, to 30, 65 and 160 landings. In practice, for a given tire, mounted on a given aeroplane, the trend curve of the height H of a given circumferential ridge as a function of the number of landings performed $N_{LPT}$, or wear curve, is determined during the first life cycle of the tire, ranging from the new tire to the totally worn tire, by virtue of the wear indicators positioned in said circumferential ridge. This wear curve thus determined, for a circumferential ridge of a given tire on a given aeroplane, can be used to predict the potential remaining wear of the tire on each observation of the tire. This makes it possible to define the moment when the replacement of the tire will be necessary and to plan the maintenance operations in order to reduce the downtime of the aeroplane. Moreover, the observation that, if appropriate, the wear of the circumferential ridge of a tire is not following this wear curve, may reveal abnormal operation of the tire, for example uneven wear, and trigger a preventive maintenance action. Similarly, the comparison of the wear curves of tires fitted on several aeroplanes of a single fleet makes it possible, in case of divergence of said wear curves, to identify the aeroplane or aeroplanes on which checks and possible adjustments should be made.

The invention has been more particularly studied in the case of an aeroplane tire of dimensions 46×17R20, intended to be fitted on the main landing gear of a liner aeroplane. For such a tire, the inflation pressure is 15.3 bar, the static load 21 tons and the maximum speed 360 km/h.

In the example studied, three circumferential ridges, including a median circumferential ridge and two shoulder circumferential ridges, each have six wear indicators that are equidistant along the circumference of the tire, that is to say distributed every 60°. Any wear indicator of a first shoulder circumferential ridge, corresponding to the outermost circumferential ridge, when the tire is mounted on the landing gear, is a pattern of 14 cylindrical cavities, composed of a state pattern of 10 wear cavities, including 9 positioned at the centre and one at the periphery of the pattern, and of a positioning pattern of 4 positioning cavities, positioned at the periphery of the pattern. Any wear indicator of the median circumferential ridge, axially at the centre of the tread, is a pattern of 13 cylindrical cavities, composed of a state pattern of 10 wear cavities, including 9 positioned at the centre and one at the periphery of the pattern, and of a positioning pattern of 3 positioning cavities, positioned at the periphery of the pattern. Any wear indicator of a second shoulder circumferential ridge, corresponding to the innermost circumferential ridge, when the tire is mounted on the landing gear, is a pattern of 15 cylindrical cavities, composed of a state pattern of 10 wear cavities, including 9 positioned at the centre and one at the periphery of the pattern, and a positioning pattern of 5 positioning cavities positioned at the periphery of the pattern. For each of the three types of wear indicator previously described, in which the numbers N1 of wear cavities are all identical, the N1=10 wear cavities $C1_i$, i varying from 1 to 10, have depths $P1_i$, respectively equal to i*(H0−HR), corresponding to wear ratios varying between 10% and 100% in 10% increments. They also have circular emerging surfaces of diameter equal to 2 mm. For each of the three types of wear indicators previously described, for which the numbers of positioning cavities N2 are different from one another, N2 varying between 3 and 5, the N2 positioning cavities $C2_j$, j varying from 1 to N2, have depths $P2_j$ all equal to 1.2*(H0−HR), corresponding to a wear ratio equal to 120%. They also have circular emerging surfaces of diameter equal to 4 mm. This configuration corresponds to the wear indicators described in FIGS. 6A and 6B.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A method for determining a state of a tire of an aeroplane, said tire comprising a tread having at least one circumferential ridge including at least one wear indicator comprising a state pattern and a positioning pattern, said at least one wear indicator extending along a radial direction, the method comprising:

capturing, via a mobile device, the positioning pattern of the at least one wear indicator comprising the state pattern and the positioning pattern, said positioning pattern marking an axial positioning of said at least one wear indicator extending along the radial direction in the tread of the tire of the aeroplane;

capturing, via the mobile device, the state pattern of the at least one wear indicator comprising the state pattern and the positioning pattern, said state pattern determining a state of wear of the at least one circumferential ridge concerned at a given instant;

analysing the captured positioning pattern and the captured state pattern of the at least one wear indicator comprising the state pattern and the positioning pattern, by comparison to reference patterns, and determining the state of wear of the at least one circumferential ridge at the given instant;

rendering information on the state of the tire of the aeroplane; and scheduling, via the mobile device, a replacement of the tire of the aeroplane based on the rendered information;

wherein the at least one wear indicator comprises a first plurality of cylindrical columns which form the state pattern and a second plurality of cylindrical columns which form the positioning pattern, each of the first plurality of cylindrical columns having a first diameter and each of the second plurality of cylindrical columns having a second diameter which differs from the first diameter.

2. The method for determining the state of the tire of the aeroplane according to claim 1, wherein said capturing the positioning pattern of the at least one wear indicator and said capturing the state pattern of the at least one wear indicator are performed simultaneously.

3. The method for determining the state of the tire of the aeroplane according to claim 1, wherein said rendering comprises displaying the information on a user interface.

4. The method for determining the state of the tire of the aeroplane according to claim 1, wherein said rendered information comprises information relating to a wear ratio U=(H0−H)/H0 of the at least one circumferential ridge, at the given instant, H0 being an initial height of the at least one circumferential ridge, measured on the tire of the aeroplane when new, and H being a remaining height of the at least one circumferential ridge, measured on the tire of the aeroplane when said tire is at least partly worn.

5. The method for determining the state of the tire of the aeroplane according to claim 4, wherein said rendered information comprises information relating to a remaining number of landings authorized by the state of wear of the at least one circumferential ridge at the given instant, the wear ratio being correlated with the remaining number of landings, in accordance with a previously established mathematical model.

6. The method for determining the state of the tire of the aeroplane according to claim 1, wherein said rendered information comprises information relating to an uneven wear of the at least one circumferential ridge at the given instant.

7. The method for determining the state of the tire of the aeroplane according to claim 1, further comprising:

identifying the tire of the aeroplane by recognizing an individualized marking consisting of a series of digits.

8. The method for determining the state of the tire of the aeroplane according to claim 1, further comprising:

identifying the tire of the aeroplane by reading an RFID identifier of the tire, said RFID identifier containing readable tire identification data.

9. The method for determining the state of the tire of the aeroplane according to claim 1, further comprising:

transmitting captured information to a database.

10. The method for determining the state of the tire of the aeroplane according to claim 1, further comprising:

transmitting captured information to a database, said captured information relating to at least one of a geolocation of the tire of the aeroplane and a date and time of said capturing of the positioning pattern and the state pattern.

11. A system for determining a state of a tire of an aeroplane, the system comprising:
- a mobile device; and
- a database;
- wherein the mobile device is configured to:
    - capture a positioning pattern of at least one wear indicator comprising a state pattern and the positioning pattern, said positioning pattern marking an axial positioning of said at least one wear indicator which extends along a radial direction in the tread of the tire of the aeroplane;
    - capture the state pattern of the at least one wear indicator comprising the state pattern and the positioning pattern, said state pattern determining a state of wear of the at least one circumferential ridge concerned at a given instant;
    - analyse the captured positioning pattern and the captured state pattern of the at least one wear indicator comprising the state pattern and the positioning pattern, by comparison to reference patterns, and determine the state of wear of the at least one circumferential ridge at the given instant;
    - render information on the state of the tire of the aeroplane; and
    - schedule a replacement of the tire based on the rendered information;
- wherein the at least one wear indicator comprises a first plurality of cylindrical columns which form the state pattern and a second plurality of cylindrical columns which form the positioning pattern, each of the first plurality of cylindrical columns having a first diameter and each of the second plurality of cylindrical columns having a second diameter which differs from the first diameter.

12. The system for determining the state of the tire of the aeroplane according to claim 11, further comprising:
- a display for conveying the state of the tire of the aeroplane.

13. The system for determining the state of the tire of the aeroplane according to claim 11, wherein the mobile device comprises a smartphone.

14. The method for determining the state of the tire of the aeroplane according to claim 6, wherein said information relating to the uneven wear of the at least one circumferential ridge at the given instant comprises a differential in wear ratio between two distinct circumferential ridges.

* * * * *